Figure 1:
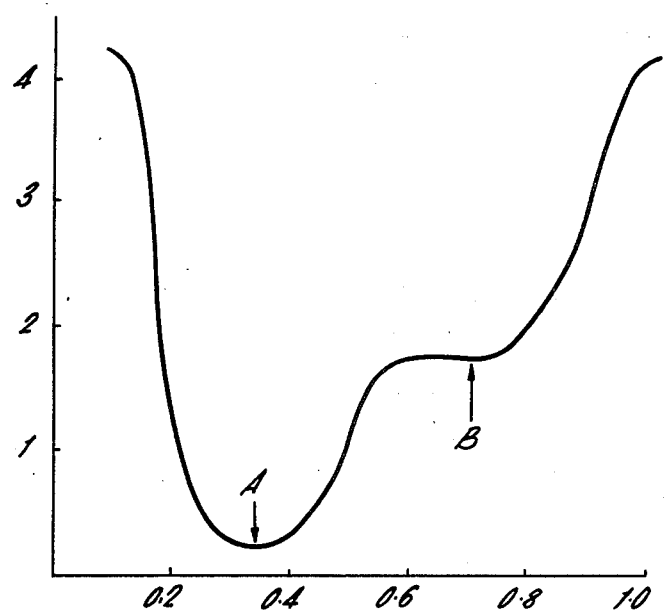

United States Patent [19]

Göringer et al.

[11] 4,190,676
[45] Feb. 26, 1980

[54] COMPOSITE FRUIT GEL AND ICE CONFECTION

[75] Inventors: Hans Göringer, Norderstedt, Fed. Rep. of Germany; Thomas R. Kelly, Wellingborough, England; Dieter Ries; Hermann Silberzahn, both of Hamburg, Fed. Rep. of Germany

[73] Assignee: Thomas J. Lipton, Englewood Cliffs, N.J.

[21] Appl. No.: 887,937

[22] Filed: Mar. 17, 1978

[30] Foreign Application Priority Data

Mar. 17, 1977 [GB] United Kingdom ............... 11469/77

[51] Int. Cl.² ............................................. A23G 9/04
[52] U.S. Cl. .................................. 426/100; 426/101; 426/565; 426/575; 426/577
[58] Field of Search ............... 426/577, 525, 100, 101, 426/130, 565, 566, 567, 575

[56] References Cited

U.S. PATENT DOCUMENTS

| | | | |
|---|---|---|---|
| 2,005,245 | 6/1935 | Stover | 426/101 |
| 2,486,194 | 10/1949 | Moser | 426/101 |
| 3,367,784 | 2/1968 | Waitman | 426/577 |
| 3,552,980 | 1/1971 | Cooper | 426/102 |
| 3,892,870 | 7/1975 | Wood | 426/577 |

*Primary Examiner*—Jeanette M. Hunter
*Attorney, Agent, or Firm*—Brumbaugh, Graves, Donohue & Raymond

[57] ABSTRACT

A composite food product is prepared by dosing a portion of an ice confection onto incipiently gelling calcium alginate or calcium low-methoxy pectate. It forms a depression in which it sits. A particular process described gives a peach Melba product.

4 Claims, 2 Drawing Figures

COMPOSITE FRUIT GEL AND ICE CONFECTION

The invention relates to composite food products.

Mass production of traditional composite food products is highly desirable: traditional products and interesting variations would become more readily and conveniently available. The type of problem that can occur can be illustrated by the following example.

A flavored composite ice confection is peach Melba in which a portion of ice cream sits in a peach segment or half. Mass production of such a product has always seemed an almost hopeless task. This is because soft-fleshed fruits such as peaches, cannot be handled individually on a large scale. Also, it is almost impossible to obtain regular supplies of fruit of adequately good and uniform quality. Further, there are extreme difficulties in factory handling of halves or segments. For instance, lack of uniformity in shape and size makes it impossible to run a large-scale packaging system where, for safe handling and transport, the fruit segment or half should sit securely in the package.

Use of moulded gelled fruit puree or pulp based on calcium alginate of calcium low-methoxy pectate, as described in GB No. 1,369,198, avoids some of these problems but cannot readily be used to prepare a satisfactory composite product such as peach Melba. This is because techniques for moulding a product with a depression are either excessively complicated or reintroduce problems of handling. For example producing the depression by cutting out a portion of the gel is difficult to engineer on a large scale. This technique would in any case suffer from the disadvantage of producing rework.

It will be appreciated from this illustrative example that the problems in particular of moulding the gel, are not confined to the particular food ingredients mentioned.

The problem has now been solved. Incipiently gelling calcium alginate or calcium low-methoxy pectate is dosed into a mould and a portion of an extrudable foodstuff is then dosed onto the still incipiently gelling calcium alginate or calcium low-methoxy pectate to form a depression in which the portion of the extrudable foodstuff sits.

The invention therefore provides a process for preparing a composite food product in which per se known incipiently gelling calcium alginate or calcium low-methoxy pectate is dosed into a mould and a portion of an extrudable foodstuff is then dosed onto the still incipiently gelling calcium alginate or calcium low-methoxy pectate to form a depression in which the portion of the extrudable foodstuff sits.

The mould is conveniently the container, e.g. a beaker, cup or tub, in which the product is finally packaged; the gel is less likely to move about for example during packing and transport. It should also be noted that the product has a further related advantage: the portion of the extrudable foodstuff fits the depression very closely and so is less likely to move during packing and transport than a product in which the portion of the extrudable foodstuff is dosed into a pre-formed depression let alone than a product in which it simply sits on the flat surface of the gel. The depression formed in the process of the invention is uneven and so gives, with the close fit of the extrudable foodstuff, firm anchorage to the portion of the extrudable foodstuff.

An aspect of the invention provides a composite foodstuff made by the process of the invention.

It is a surprising feature of the present invention that an extrudable foodstuff can be used to displace the incipiently gelling calcium alginate or calcium low-methoxy pectate to form a depression. Once it is appreciated that this can be done, it is comparatively easy to find the particular conditions required. A general rule cannot be given. This is because so many variables are involved, for instance the hardness, size and density of the portion of the extrudable foodstuff used, the manner in which it is delivered (preferably extruded), the distance between the nozzle from which it is delivered and the surface of the incipiently gelling system, the amount and the quality of the calcium alignate or calcium low-methoxy pectate and the timing and mixing used in the preparation of the incipiently gelling calcium alignate or calcium low-methoxy pectate. In particular it has been found that the harder the extrudable foodstuff the longer the time should be between dosing of the incipiently gelling system into the moulds and delivery of the portion of the extrudable foodstuff onto the surface of the incipiently gelling calcium alignate or calcium low-methoxy pectate.

A typical profile for the movement of an extrusion head is shown in FIG. 1 where y is height in cms above the surface of the incipiently gelling system and x is time in seconds. A valve opens at A to allow flow of the extrudable foodstuff and closes at B. A valve that gives an aesthetically pleasing shape to the dosed extrudable foodstuff, e.g. when it is ice cream, is fluted. Such valves and such profiles for the movement are well-known.

For product acceptability the gel usually contains a dispersed foodstuff. This can be, for instance, fruit puree.

For product acceptability and because the gel system is usually much dearer than the extrudable foodstuff the thickness of the shell of gel is preferably in the range 0.4 to 1 cms. It is surprising feature of the invention that extrudable foodstuffs can be used to produce such a thin shell simply by being delivered onto the surface of incipiently gelling calcium alginate or calcium low-methoxy pectate.

Although the invention is illustrated below in terms of peach Melba, it will be appreciated that the process can be used to produce such products whatever the type of flavouring or ingredient used in the gel and whatever the extrudable foodstuff. For example the invention provides the opportunity to prepare fantasy fruits where the fruit flavour is, for example, blackcurrant but the general shape is that of a peach segment.

As mentioned above, GB No. 1,369,198 describes the preparation of simulated fruit based on calcium alginate or calcium low-methoxy pectate. Suitable techniques for preparing incipiently gelling calcium alginate or calcium low-methoxy pectate are described in those specifications. These techniques prepare incipiently gelling calcium alignate or calcium low-methoxy pectate by rapidly making a mixture comprising an alginate or a low methoxy pectate sol and a controlled source of calcium ions and allowing the mixture to gel under substantially shear-free conditions. Any suitable dispersed foodstuff can be incorporated e.g. fruit flavour, pulp or puree. Preferably the source of calcium ions is a calcium salt substantially insoluble under neutral conditions but soluble under acid conditions and an acid is used to control the release of calcium ions.

Preferred extrudable foodstuffs are extrudable ice confections, in particular ice cream.

Figure 2:
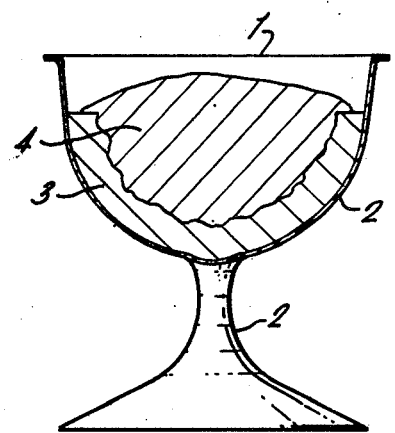

FIG. 2 shows a section of a typical product of the invention in packaged form where 1 is the lid, 2 the plastic goblet, 3 the gel and 4 the ice cream.

The invention will be illustrated further by the following examples.

EXAMPLE 1

Two streams of the following compositions were mixed rapidly and then immediately dosed in 60 g portions into plastic goblet-shaped beakers.

|  | % by weight of both streams |
|---|---|
| Stream 1 | |
| Sodium alginate | 0.85 |
| CaHPO$_4$ | 0.15 |
| Sucrose | 19 |
| Soft water to | 50 |
| Stream 2 | |
| Sodium citrate | 0.1 |
| Malic acid | 0.7 |
| Sucrose | 14 |
| Pureed canned peaches | 35 = 23% peach segments + 12% syrup |
| Flavour & Colour | 0.2 |

Conventional ice cream was delivered in 35 g portions straight from the whipper/freezer to the surface of the incipiently gelling peach calcium alginate within 2 seconds of mixing of the two streams. A fluted extrusion nozzle was used and a delivery profile was used as shown in FIG. 1. The ice cream displaced the incipiently gelling peach calcium alginate to form a 4 mm shell in which the ice cream sat.

A suitable Melba sauce was then dosed onto the surface of the ice cream, a lid was placed on the top of the beaker and the product was then passed to a conventional hardening tunnel where the ice cream was hardened.

EXAMPLE 2

Dosing of incipiently gelling peach calcium alginate prepared according to Example 4 of GB No. 1,369,198 in the process of Example 1 would require a 30 second interval between dosing of the incipiently gelling peach calcium alginate and delivery of the ice cream. (Note that peach pulp is used instead of the apricot pulp mentioned in Example 4 of GB No. 1,369,189).

What is claimed is:

1. A process for preparing a composite food product, which comprises:
   (a) dosing an incipiently gelling material selected from the group consisting of calcium alginate and calcium low-methoxy pectate into a mold, and
   (b) dosing a portion of an ice confection onto the incipiently gelling dosed material, thereby forming a depression in the incipiently gelling dosed material in which the ice confection can sit.

2. A process as claimed in claim 1 in which the mold is a container in which the product is finally packaged.

3. A process as claimed in claim 1 in which the incipiently gelling calcium alginate or calcium low-methoxy pectate contains fruit flavour or fruit puree.

4. A process as claimed in claim 3 in which the ice confection is ice cream.

* * * * *

UNITED STATES PATENT AND TRADEMARK OFFICE
CERTIFICATE OF CORRECTION

PATENT NO. : 4,190,676
DATED : February 26, 1980
INVENTOR(S) : Göringer et al.

It is certified that error appears in the above-identified patent and that said Letters Patent are hereby corrected as shown below:

On first page, Assignee given as "Thomas J. Lipton" rather than --Thomas J. Lipton, Inc.--;

First page, ABSTRACT, cancel the last sentence;

Col. 1, line 24, "alginate of" should read --alginate or--;

Col. 2, line 15, "alignate" should read --alginate--;

Col. 2, line 17, "alignate" should read --alginate--;

Col. 2, line 23, "alignate" should read --alginate--;

Col. 2, line 40, after "It is" insert --a--;

Col. 2, line 59, "alignate" should read --alginate--.

Signed and Sealed this

*Twenty-second* Day of *July 1980*

[SEAL]

*Attest:*

SIDNEY A. DIAMOND

*Attesting Officer*       *Commissioner of Patents and Trademarks*